Dec. 15, 1936.  P. D. HOWE ET AL  2,064,261

SAW

Filed Nov. 2, 1935

INVENTORS
Paul D. Howe
Stanley L. Batchelder
John A. Naismith
ATTORNEY

Patented Dec. 15, 1936

2,064,261

UNITED STATES PATENT OFFICE 2,064,261

SAW

Paul D. Howe and Stanley L. Batchelder, San Jose, Calif.

Application November 2, 1935, Serial No. 47,993

1 Claim. (Cl. 143—133)

Our invention relates particularly to saws used in the manufacture of lumber, and still more particularly to the type known as band saws.

In using the band saw as heretofore commonly constructed, that is, the ordinary thin saw having a substantially uniform thickness throughout its entire width, it has been found that its physical characteristics are such that it can only be operated at a relatively low rate of feed. When this low feed limit is passed forces are brought into play tending to set up a weaving or twisting movement of the metal band, which, of course, destroys its usefulness.

It is, therefore, one object of the present invention to provide a saw capable of being operated at a high rate of feed without impairing its accuracy.

It is another object of the invention to provide a saw of the character indicated so constructed that there will be less waste in the material operated upon and more useful material obtained from a given piece of lumber.

Figure 1:
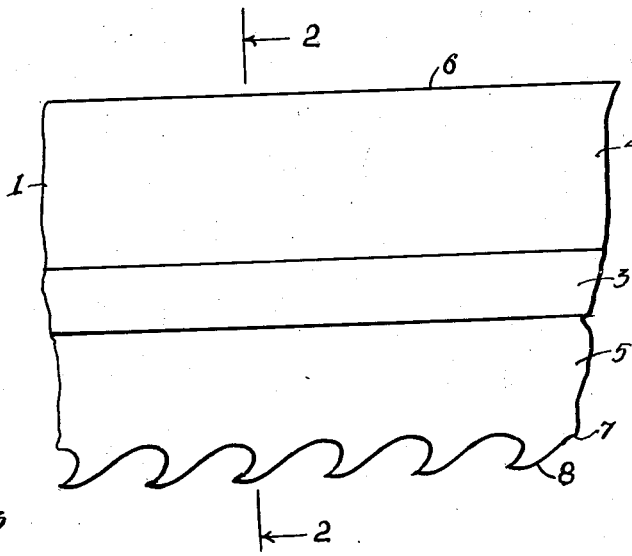
Figure 1 is a side elevation of a portion of a saw embodying our invention.
Figure 2:
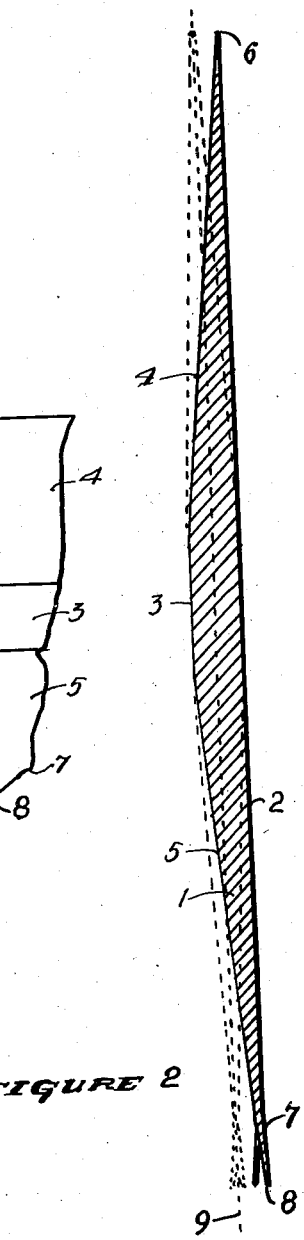
Figure 2 is a sectional view on line 2—2 of Figure 1, greatly enlarged.

Referring now to that form of the invention shown in Figures 1 and 2, the reference character 1 indicates a portion of a metal band forming the body portion of the saw. This band is flat as indicated at 2 on the side passing over and contacting the drive wheel, not shown. The other side of the band has a flat portion as 3 extending longitudinally of the band and along its central portion, and side portions 4 and 5 sloping away from the central portion 3 to the edges 6 and 7. In the present case the edge 7 is provided with teeth as 8.

In operation our improved form of band saw as above described is mounted upon the wheels in the same manner as an ordinary band saw, with its flat side engaging said wheels, and when at rest its cross-sectional configuration appears as shown in solid lines in Figure 2. When the saw is operated at cutting speeds, however, a change takes place in its cross-sectional configuration throughout its length between the supporting wheels. This change is occasioned by its high speed of rotation which throws the two edges into the plane indicated by dotted line 9.

When work is fed against a common band saw its speed of rotation is decidedly limited because the cutting edge of the saw will run off at an angle to its normal plane under high speeds when it encounters a wood section presenting increased resistance to cutting, or when the work is fed a little too fast. But with our improved saw the cutting edge is held true to the work at all speeds, not only because of the extra thickness of the saw at its center but also because of the forces set up in the saw due to its forced shape as shown in dotted lines in Figure 2, which hold it there during the cutting operation.

Another important feature of a saw constructed in the manner hereinbefore described is that because of the slight set required in the teeth but little material is removed from the lumber in the sawing operation. While the central portion of the band is thicker than the cut made by the teeth there is sufficient resiliency in the wood to permit it to pass readily therethrough, at the same time preventing the wood from binding upon the teeth.

Figure 3:
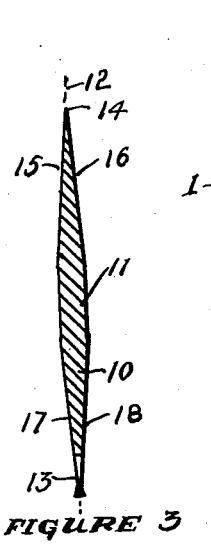
Figure 3 is a sectional view of another embodiment of the invention.

In the embodiment of the invention shown in Figure 3 a band 10 is shown having the thick central portion at 11, but in this case this thickened central portion is equally disposed on both sides of the median line 12 and both sides of the band are bevelled to the front and rear edges 13 and 14 as at 15—16 and 17—18.

In both of the embodiments of the invention herein disclosed the tendency of the cutting edge of the saw to leave the true cutting plane at the higher rates of feed and follow lesser paths of resistance at an angle thereto is successfully resisted by the relatively thick central portion of the band.

It is to be understood, of course, that while we have herein shown and described but two specific embodiments of the invention, changes in form, construction, and arrangement of the several parts may be made within the scope of the appended claim.

We claim:

A band saw having the following characteristics when viewed in transverse cross section, namely, a flat side, extending to the two edges of the band, a thickened central portion, and angularly disposed sides extending from the central portion to both of said edges.

PAUL D. HOWE.
STANLEY L. BATCHELDER.